(12) United States Patent
Xiong et al.

(10) Patent No.: US 11,714,244 B2
(45) Date of Patent: Aug. 1, 2023

(54) OPTICAL ASSEMBLY AND MANUFACTURING METHOD THEREOF

(71) Applicant: Wuhan Telecommunication Devices Co., Ltd, Wuhan (CN)

(72) Inventors: Fen Xiong, Wuhan (CN); Tingyu Li, Wuhan (CN); Rikai Zhou, Wuhan (CN); Yongan Fu, Wuhan (CN); Liping Sun, Wuhan (CN)

(73) Assignee: Wuhan Telecommunication Devices Co., Ltd

( * ) Notice: Subject to any disclaimer, the term of this patent is extended or adjusted under 35 U.S.C. 154(b) by 140 days.

(21) Appl. No.: 17/263,059

(22) PCT Filed: Dec. 25, 2018

(86) PCT No.: PCT/CN2018/123402
§ 371 (c)(1),
(2) Date: Jan. 25, 2021

(87) PCT Pub. No.: WO2020/019658
PCT Pub. Date: Jan. 30, 2020

(65) Prior Publication Data
US 2021/0373263 A1    Dec. 2, 2021

(30) Foreign Application Priority Data

Jul. 26, 2018  (CN) .......................... 201810836687.0

(51) Int. Cl.
*G02B 6/42*  (2006.01)

(52) U.S. Cl.
CPC ......... *G02B 6/4214* (2013.01); *G02B 6/4213* (2013.01); *G02B 6/4286* (2013.01); *G02B 6/4296* (2013.01)

(58) Field of Classification Search
None
See application file for complete search history.

(56) References Cited

U.S. PATENT DOCUMENTS 6,947,671 B2 *  9/2005  Sekiya ................. G02B 6/4214
                                                  359/489.14
7,251,076 B1    7/2007  Okada et al.
(Continued)

FOREIGN PATENT DOCUMENTS

| CN | 1393713 A | 1/2003 |
| CN | 1761900 A | 4/2006 |

(Continued)

OTHER PUBLICATIONS

International Search Report for PCT/CN2018/123402 dated Apr. 29, 2019; 3 pages.
(Continued)

*Primary Examiner* — Michelle R Connelly
(74) *Attorney, Agent, or Firm* — Lerner David LLP

(57) ABSTRACT

Disclosed are an optical assembly and a manufacturing method therefor. The optical assembly comprises a laser component (2) and a crystal (1). The crystal (1) is disposed on the laser component (2). The laser component (2) is used to produce a laser beam. The crystal (1) is used to split the laser beam incident onto the crystal (1) so as to generate a first beam (15) and a second beam (16). The first beam (15) is used for front light emission and the second beam (16) is used for backlight monitoring. The optical assembly can split a laser beam to achieve the backlight monitoring function without adding a splitter film. It has good stability in light splitting and reduces the risk of failure in an optical device.

5 Claims, 5 Drawing Sheets

(56) References Cited

U.S. PATENT DOCUMENTS

| | | | |
|---|---|---|---|
| 8,923,671 B2 * | 12/2014 | Hung | ........................ G02B 6/32 |
| | | | 359/834 |
| 9,170,150 B2 * | 10/2015 | Hung | ..................... G01J 1/0477 |
| 2003/0002155 A1 | 1/2003 | Xue et al. | |
| 2004/0179784 A1 | 9/2004 | Vancoille et al. | |
| 2012/0063721 A1 | 3/2012 | Chen | |
| 2014/0003768 A1 | 1/2014 | Hung | |
| 2017/0168250 A1 | 6/2017 | Zhang et al. | |
| 2017/0192214 A1 | 7/2017 | Chen et al. | |

FOREIGN PATENT DOCUMENTS

| | | |
|---|---|---|
| CN | 104577708 A | 4/2015 |
| CN | 106886072 A | 6/2017 |
| CN | 108873194 A | 11/2018 |
| EP | 0636861 A1 | 2/1995 |
| TW | 201400897 A | 1/2014 |

OTHER PUBLICATIONS

Search Report for Chinese Application No. 2018108366870 dated May 14, 2019; 3 pages.

* cited by examiner

Making an incident surface of the crystal

Making an emission surface of the crystal, wherein the crystal is used to split a laser beam entering through the incident surface to generate a first beam and second beam, the first beaming being emitted from an emission surface, and the second light being emitted from the incident surface Providing a laser component on a preset reference plane, and setting the laser component to emit a laser beam in a direction

Providing a crystal that meets a light-splitting condition at a predetermined position, such that the crystal splits the laser beam incident on the incident surface into a first beam and a second beam, the first beam being emitted from an emission surface and the second beam being emitted from the incident surface

FIG. 9

OPTICAL ASSEMBLY AND MANUFACTURING METHOD THEREOF

CROSS-REFERENCE TO RELATED APPLICATIONS

The present application is a national phase entry under 35 U.S.C. § 371 of International Application No. PCT/CN2018/123402 filed Dec. 25, 2018, which claims priority from Chinese Application No. 201810836687.0 filed Jul. 26, 2018, all of which are hereby incorporated herein by reference.

TECHNICAL FIELD

The present disclosure belongs to the technical field of optical communications, and in particular, relates to an optical assembly and a manufacturing method therefor.

BACKGROUND

In recent years, with the continuous improvement of global cloud service and the growing demand of telecommunication and datacenter market, the optical communication industry has developed rapidly, simultaneously, the demand of high-speed modules is growing gradually.

In practical applications, light of the optical module is emitted from a laser diode. The stability of optical power of the laser is affected by many factors. For example, self-heating of the laser, temperature and humidity of environment, working time of the laser, variations of threshold current, and heat dissipation of the optical module, etc., will all affect the stable output of optical power of the laser. Therefore, it is desirable to introduce an optical device with a backlight monitoring function into the optical module so as to achieve real-time monitoring of optical power of the laser.

At present, most of the optical devices with the backlight monitoring function use a plating splitter film to split light. However, as the variation of temperature and other environmental factors, polarization characteristics of the light source will also change. As the film layer of the splitter film is susceptive to such changes, the splitter film has poor stability in splitting light. In addition, the process for plating the splitter film, including film layer designing, film material purchasing, film layer plating, inspection, reliability test and the like, will increase the risk of failure in optical devices.

SUMMARY

In view of the above mentioned defects and requirements for improvement of the current scheme, the present disclosure provides a crystal and a manufacturing method to split beam of the laser diode by utilizing the birefringence effect of the crystal and the particular structure of the crystal, thereby solving the technical problems associated such as poor stability and high risk of failure with utilizing the splitter film to split light in the optical device.

In order to realize the above object, according to an aspect of the present disclosure, there is provided an optical assembly. The optical assembly comprises a crystal 1 and a laser component 2. The crystal 1 is provided on the laser component 2. The laser component 2 is used to produce a laser beam. The crystal 1 is used to split the laser beam incident thereon to generate a first beam and a second beam, wherein the first beam is emitted from a front side and the second beam is used for backlight monitoring.

In order to realize the above object, according to another aspect of the present disclosure, there is provided a manufacturing method for an optical assembly. The manufacturing method for an optical assembly comprises: providing a laser component on a preset reference plane and setting the laser component to emit a laser beam in a direction; providing a crystal which meets a splitting condition at a predetermined position to split the laser beam incident on an incidence surface of the crystal into a first beam and a second beam, wherein the first beam is emitted from an emission surface of the crystal, and the second beam is emitted from the incidence surface.

Generally speaking, compared with the prior arts, the above technical solutions conceived in the present disclosure have following beneficial advantages: the optical assembly of the present disclosure uses the crystal with a particular structure such that the laser beam is subject to birefringence while passing through the incidence surface of the crystal emitting a first beam and a second beam. The first beam is emitted as a front light from the emission surface and the second beam is emitted as a back light from the incidence surface. The crystal of the present disclosure can split the laser beams with excellent light-splitting stability without adding a splitter film. Meanwhile, it eliminates the process for plating the splitter film such as film layer designing, film material purchasing, film layer plating, inspection, reliability test and the like, thereby reducing the risk of failure in the optical device.

BRIEF DESCRIPTION OF THE DRAWINGS

In order to demonstrate the technical solutions of the present application or the state of prior art clearly, brief descriptions are given for the accompanying drawings of the embodiments or the prior arts. Apparently, the accompanying drawings described hereinafter only illustrate some embodiments of the present disclosure, and other accompanying drawings may also be derived based on these accompanying drawings without creative work by those skilled in the art.

FIG. 9 is a schematic flowchart of a method for manufacturing an optical assembly according to an embodiment of the present disclosure.

DETAILED DESCRIPTION

Figure 1:
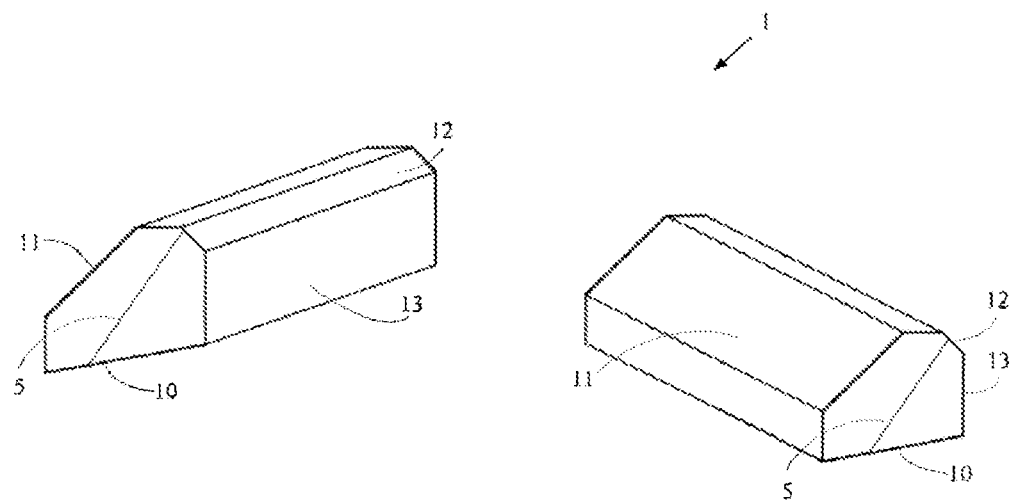
FIG. 1 is a schematic structural diagram of a crystal according to an embodiment of the present disclosure.

For clear description of objectives, technical solutions, and advantages of the present disclosure, the present disclosure is further described in detail below with reference to embodiments and accompanying drawings. It should be understood that the embodiments described here are only exemplary ones for illustrating the present disclosure, and are not intended to limit the present disclosure. In addition, technical features involved in various embodiments of the present disclosure described hereinafter may be combined as long as these technical features are not in conflict.

Embodiment 1

Referring to FIGS. 1 to 4 together, the present embodiment provides a crystal 1 which includes an incidence surface 10 and an emission surface 13. The crystal 1 is used to split a laser beam incident on the incidence surface 10 of the crystal 1 to generate a first beam 15 and a second beam 16. The first beam 15 is emitted from the emission surface 13, and the second beam 16 is emitted from the incidence surface 10. In practical application scenarios, the first beam 15 may be used as a front light for data transmission, and the second beam 16 may be used as a back light for monitoring the power of the laser.

The crystal 1 further comprises a first reflection surface 11 and a second reflection surface 12. The first reflection surface 11 is used to reflect the first beam 15 incident on the first reflection surface 11 to the emission surface 13 where the first light 15 may be emitted. The first reflection surface 11 is also used to reflect the second beam 16 incident on the first reflection surface 11 to the second reflection surface 12, and the second reflection surface 12 is used to reflect the second beam 16 incident on the second reflection surface 12 to the incidence surface 10 where the second beam 16 may be emitted.

Specifically, the incidence surface 10 forms a predetermined first angle with respect to a preset reference plane, the first reflection surface 11 forms a predetermined second angle with respect to the reference plane, the second reflection surface 12 forms a predetermined third angle with respect to the reference plane, and an optical axis 5 of the crystal forms a predetermined fourth angle with respect to a normal line of the incidence surface 10.

When the laser beam impinges onto the incidence surface 10 of the crystal 1 in a direction perpendicular to the reference plane, the first angle, the second angle, the third angle and the fourth angle cause the laser beam entering the crystal 1 through the incidence surface 10 to be refracted into the first beam 15 which is totally reflected on the first reflection surface 11 and then emitted through the emission surface 13 and the second beam 16 which is totally reflected on the first reflection surface 11 and the second reflection surface 12 and then emitted through the incidence surface 10.

It can be understood that the reference plane is determined by the propagation direction of the laser beam, and it can be a physical plane or a virtual plane. For example, the reference plane may be a horizontal plane in the earth coordinate system or a plane in another direction as long as the propagation direction of the laser beam is ensured to be perpendicular to the reference plane.

Figure 2:
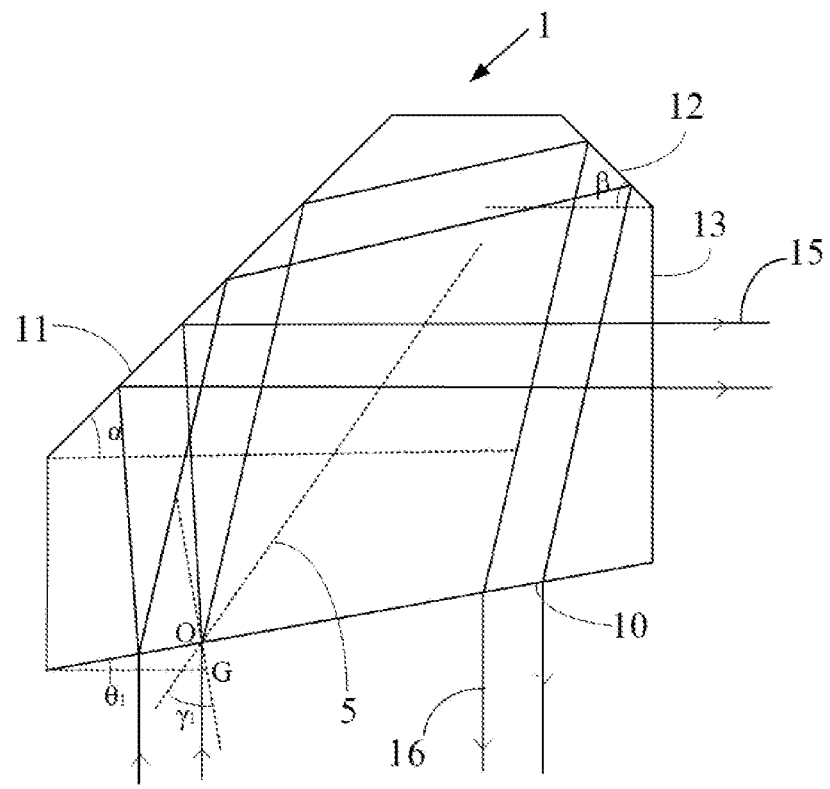
FIG. 2 is a schematic diagram of propagation trajectories of a first beam and a second beam splitted by the crystal shown in FIG. 1.
Figure 4:
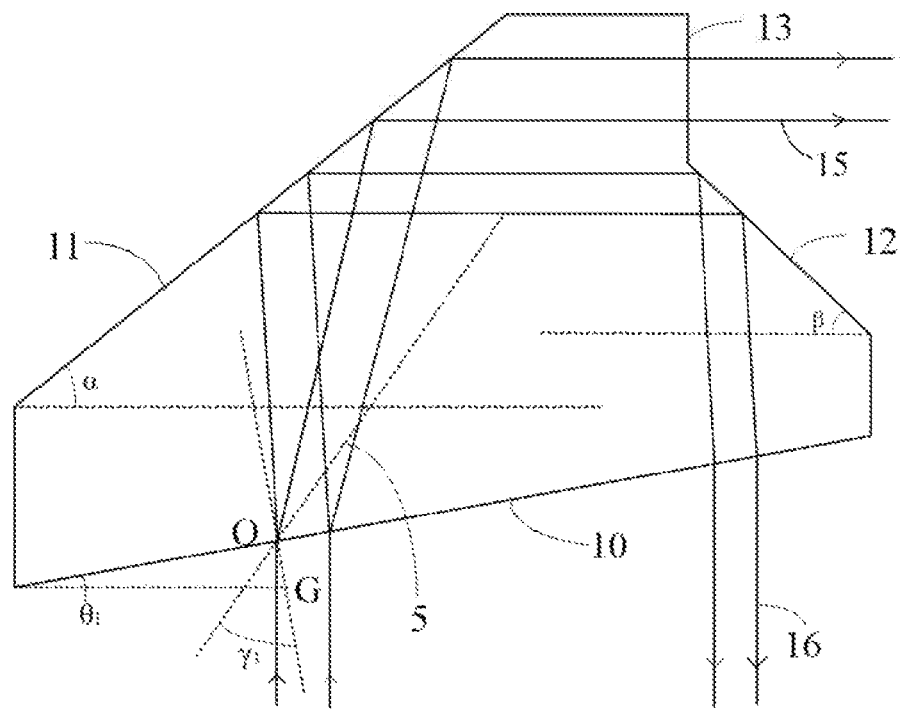
FIG. 4 is a schematic diagram of propagation trajectories of the first beam and the second beam splitted by the crystal shown in FIG. 1.

As shown in FIG. 2 and FIG. 4, a straight line OG represents a normal line of the incidence surface 10, and an angle between the optical axis 5 and the straight line OG is $\gamma_1$. $\gamma_1$ represents an angle of the optical axis 5 of the crystal 1 relative to the normal line of the incidence surface 10, that is, the fourth angle is equal to $\gamma_1$. An angle between the incidence surface 10 and the reference plane is $\theta 1$, i.e. the first angle is equal to $\theta 1$. An angle between the first reflection surface 11 and the reference plane is $\alpha$, i.e. the second angle is equal to $\alpha$. An angle between the second reflection surface 12 and the reference plane is $\beta$, i.e. the third angle is equal to $\beta$.

In practical application scenarios, the laser beam produced by the laser comprises an elliptically polarized light or a circularly polarized light, which can be separated into polarized lights having oscillation directions perpendicular to each other. When the laser beam emitted from the laser is subjected to birefringence, it would be separated into o-light and e-light of which oscillation directions are perpendicular to each other. The o-light is an ordinary light which propagates with an ordinary refractive index and satisfies the refraction and reflection laws. The e-light propagates with a non-ordinary refractive index and does not satisfy the refraction and reflection laws.

In the present embodiment, the specific crystal 1 is used to double-refract the laser beam incident onto the crystal 1 so as to separate it into the o-light and the e-light. The o-light may be emitted as a front light for data transmission or other purposes, and the e-light may be used as a back light to monitor the optical power of the laser beam emitted by the laser in real time and adaptively adjust the optical power according to actual conditions. Optionally, in the present embodiment, the e-light can also be emitted as the front light for data transmission or other purposes, and the o-light can be used as the back light to monitor the optical power of the laser beam emitted by the laser in real time and adaptively adjust the optical power according to the actual conditions.

It can be understood that the crystal 1 can split the laser beam in following two ways:

Light-splitting way 1: the first beam 15 is the e-light, i.e., the e-light is emitted as the front light from the emission surface 13; and the second beam 16 is the o-light, i.e., the o-light is emitted as the back light from the incidence surface 10.

Light-splitting way 2: the first beam 15 is the o-light, i.e., the o-light is emitted as the front light from the emission surface 13; and the second beam 16 is the e-light, i.e., the e-light is emitted as the back light from the incidence surface 10.

Specifically, the crystal 1 shown in FIG. 1 is suitable for the light-splitting way 1. For example, when the first beam 15 and the second beam 16 both have a wavelength of 850 nm, the first beam 15 is the e-light, the second beam 16 is the o-light, and the crystal 1 is a YVO4 crystal, in addition, the first angle may be 14°, the second angle may be 51.5°, the third angle may be 38.5°, and the fourth angle may be 45°. When the first beam 15 and the second beam 16 both have a wavelength of 850 nm, the first beam 15 is the e-light, the second beam 16 is the o-light, and the crystal 1 is a LiNbO3 crystal, in addition, the first angle may be 10°, the second angle may be 47.2°, the third angle may be 42.8°, and the fourth angle may be 45°.

Figure 3:
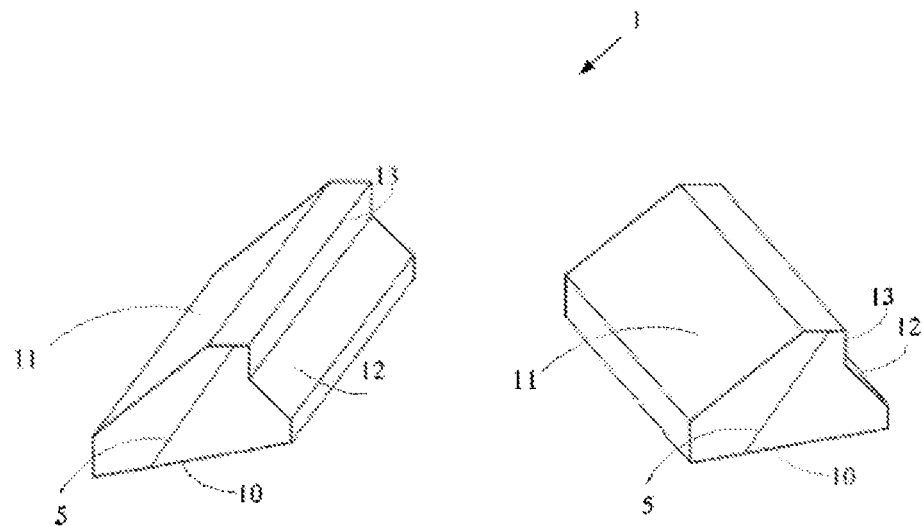
FIG. 3 is a schematic structural diagram of another crystal according to an embodiment of the present disclosure.

The crystal 1 shown in FIG. 3 is suitable for the light-splitting way 2. For example, when the first beam 15 and the second beam 16 both have a wavelength of 850 nm, the first beam 15 is the o-light, the second beam 16 is the e-light, and the crystal 1 is a YVO4 crystal, in addition, the first angle may be 10°, the second angle may be 40°, the third angle may be 50.7°, and the fourth angle may be 45°. When the first beam 15 and the second beam 16 both have a wavelength of 850 nm, the first beam 15 is the o-light, the second beam 16 is the e-light, and the crystal 1 is a LiNbO3 crystal, in addition, the first angle may be 10° the second angle may be 38.5°, the third angle may be 51.3°, and the fourth angle may be 45°.

The light-splitting principle and implementation of the crystal 1 based on the light-splitting way 1 and the light-splitting way 2 will be described in detail below.

Here, it should be emphasized that the aforementioned values are results obtained by rounding, and the angle values of the crystal 1 mentioned in the above examples are optimal results to ensure total reflection of the beam on the reflection surfaces in order to achieve the effect of making full use of the optical energy. In a practical manufacturing and production process, however, due to the process error or other considerations, the respective angle values may be different from those listed above, i.e., a certain tolerance range may be allowable. The inventors found on the basis of a lot of experiments that when the first angle, the second angle, the third angle, and the fourth angle each have a tolerance within ±1°, the good light-splitting effect can also be realized.

In the practical application scenarios, the crystal 1 is mainly used in the field of optical communications. At present, the spectral window for optical communications mainly includes wavelengths of 850 nm, 1310 nm, and 1550 nm. In the above examples, a matching relationship between the material of crystal 1 and the respective angles is described in a case where the laser wavelength is 850 nm. When the wavelength is 1310 nm or 1550 nm or other values, based on the wavelength of the laser beam, a suitable material may be selected for the crystal 1, and values of the first angle $\theta_1$, the second angle $\alpha$, the third angle $\beta$ and the fourth angle $\gamma_1$ may be determined respectively, so as to realize the light-splitting function.

In contrary to the prior arts, the crystal provided in the present embodiment can split a laser beam without adding a splitter film, so as to meet the requirements of different scenarios. For example, when the backlight monitoring function is needed, the emission power of the laser can be adaptively adjusted according to the power of the backlight. The light-splitting method of the present disclosure has good stability and can reduce the risk of failure in the optical device.

Embodiment 2

Figures 5, 6:
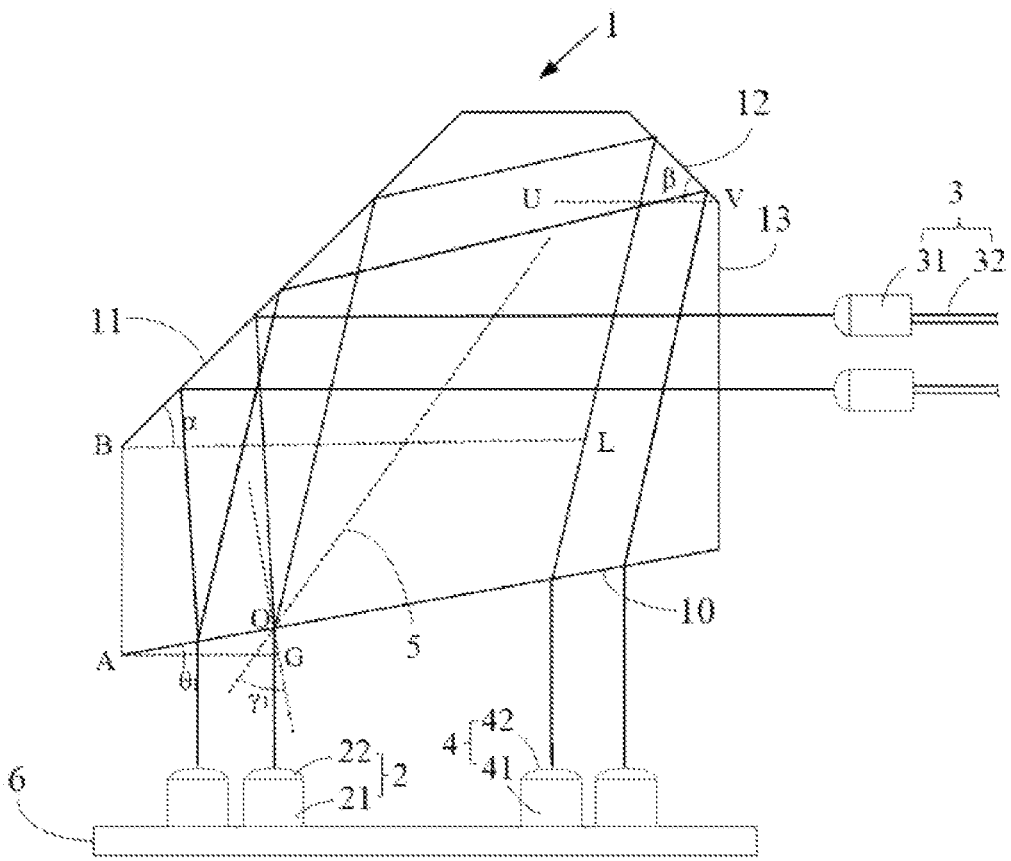
FIG. 5 is a schematic flowchart of a method for manufacturing a crystal according to an embodiment of the present disclosure.
FIG. 6 is a schematic structural diagram of an optical assembly according to an embodiment of the present disclosure.

Referring to FIG. 5, the present embodiment provides a method for manufacturing a crystal, which is applicable to the crystal of any of the above embodiments. The method for manufacturing a crystal includes the following steps:

Step 50: manufacturing an incidence surface of the crystal.

In the present embodiment, the incidence surface of the crystal may be manufactured according to actual needs.

Step 51: manufacturing an emission surface of the crystal, where the crystal is used to split a laser beam incident on the incidence surface of the crystal so as to generate a first beam which is emitted from the emission surface and a second beam which is emitted from the incidence surface.

In this embodiment, the emission surface of the crystal may be manufactured according to actual requirements. The crystal of this embodiment is used to split the laser beam entering the crystal from the incidence surface to generate the first beam which is emitted from the emission surface and the second beam which is emitted from the incidence surface.

Specifically, the crystal further includes a first reflection surface and a second reflection surface, and in the actual manufacturing process, the first reflection surface and the second reflection surface of the crystal also need to be manufactured. The crystal may be processed according to actual needs so that an optical axis of the crystal is orientated in a predetermined direction.

In the crystal manufactured by the manufacturing method of the present embodiment, the incidence surface forms a predetermined first angle with respect to a predetermined reference plane, the first reflection surface forms a predetermined second angle with respect to the reference plane, the second reflection surface forms a predetermined third angle with respect to the reference plane, and the optical axis of the crystal forms a preset fourth angle with respect to a normal line of the incidence surface.

Here, it should be noted that the above-mentioned predetermined direction in which the optical axis of the crystal satisfies refers to a direction of the optical axis of the crystal where the optical axis of the crystal forms a predetermined fourth angle with respect to the normal line of the incidence surface.

In an actual application scenario, when the laser beam impinges onto the incidence surface of the crystal in a direction perpendicular to the reference plane, the first angle, the second angle, the third angle and the fourth angle cause the laser beam entering the crystal through the incidence surface to be refracted into the first beam and the second beam, and the first beam is emitted through the emission surface after being totally reflected on the first reflection surface, while the second beam is emitted through the incidence surface after being totally reflected on the first reflection surface and the second reflection surface.

Specifically, a crystal made of a suitable material can be selected based on the wavelength of the required laser beam, and then the values of the first angle, the second angle, the third angle, and the fourth angle can be determined based on the material of the crystal and the wavelength of the laser beam. Then the incidence surface, the first reflection surface and the second reflection surface may be manufactured according to the first angle, the second angle and the third angle, and the crystal may be cut according to the fourth angle so as to ensure that the angle between the optical axis of the crystal and the interface normal line of the incidence surface is equal to the fourth angle.

The manufacturing method of the present embodiment may be used to manufacture the crystal according to any one of the above embodiments. The structure of the crystal is discussed above in Embodiment 1 and a repetitive description thereof is omitted here.

Embodiment 3

Referring to FIG. 6, the present embodiment provides an optical assembly that includes a crystal 1 and a laser component 2, wherein the laser component 2 is used to produce a collimated laser beam, and the crystal 1 is used to split the laser beam sent by the laser component 2. The optical assembly of the present embodiment may adopt the crystal of any of the above-mentioned embodiments and the crystal manufactured by the manufacturing method of any of the above-mentioned embodiments.

The laser component 2 includes a laser 21 and a collimating lens 22 provided on the laser 21, wherein the laser 21 is used to generate a laser beam with a preset wavelength, and the collimating lens 22 is used to integrate the laser beam into a collimated laser beam, enabling the laser component 2 to generate a collimated laser beam.

The laser beam produced by the laser may an elliptically polarized light or a circularly polarized light, which can be separated into polarized lights having oscillation directions perpendicular to each other. For example, the laser 21 is a Vertical Cavity Surface Emitting Laser (VCSEL) laser. The VCSEL laser can be used to transmit data at a high speed in an optical fiber network which can transmit a larger amount of data at a faster speed than a traditional cable system. When the laser beam sent from the VCSEL laser is subject to birefringence, it would be separated into o-light and B-light, of which oscillation directions are perpendicular to each other. The o-light is an ordinary light which propagates with an ordinary refractive index and satisfies the refraction and reflection laws. The e-light propagates which a non-ordinary refractive index and does not satisfy the refraction and reflection laws.

In the present embodiment, the structure of the crystal 1 is rationally designed and an incident angle of the laser beam on the incidence surface 10 is preset such that the laser beam can be effectively splitted two portions, one of which may be emitted as a front light, and another of which may be used as a back light, so as to monitor and adaptively adjust the emission power of the laser 21. For example, a specific crystal 1 is used to double-refract the laser beam incident thereon to separate the o-light and the e-light. The o-light may be emitted as the front light for data transmission or other purposes, and the e-light is used as the back light to monitor the optical power of the laser beam emitted by the laser in real time and adaptively adjust the optical power according to the actual conditions. Optionally, in the present embodiment, the e-light can also be emitted as the front light for data transmission or other purposes, and the o-light can be used as the back light to monitor the optical power of the laser light emitted by the laser 21 in real time and adaptively adjust the optical power according to the actual conditions.

The crystal 1 includes an incidence surface 10, a first reflection surface 11, a second reflection surface 12 and an emission surface 13, wherein the incidence surface 10 is used to refract the beam propagated to the incidence surface 10, the first reflection surface 11 and the second reflection surface 12 are used to totally reflect the beam propagated to the corresponding reflection surfaces, and the emission surface 13 is used to emitting the beam to be received and used by a subsequent optical module.

In order to clearly explain the principle and process of how the crystal 1 of the present embodiment to split a laser beam, there is introduced a preset reference plane which is perpendicular to the laser beam emitted by the laser component 2. It can be understood that the reference plane is determined by the propagation direction of the laser beam, and it can be a physical plane or a virtual plane, being introduced only for the convenience of explaining and analyzing the light-splitting principle of the present embodiment. For example, the reference plane can be a horizontal plane in the earth coordinate system or a plane in another direction as long as the propagation direction of the laser beam is ensured to be perpendicular to the reference plane.

Specifically, the incidence surface 10 forms a first angle with respect to the reference plane, the first reflection surface 11 forms a second angle with respect to the reference plane, the second reflection surface 12 forms a third angle with respect to the reference plane, and an optical axis 5 of the crystal 1 forms a fourth angle with respect to a normal line of the incidence surface 10. The first angle, the second angle, the third angle and the fourth angle cause the laser beam entering the crystal 1 through the incidence surface 10 to be refracted into the first beam and the second beam, and the first beam is totally reflected on the first reflection surface 11 and then emitted through the emission surface 13 as the front light; and the second beam is totally reflected on the first reflection surface 11 and the second reflection surface 12 and then emitted through the incidence surface 10 as the back light.

In the present embodiment, the first beam is used as the front light, and the second beam is used as the backlight. The optical assembly further comprises a receiving component 3 provided on a side of the emission surface 13 of the crystal 1 and a monitoring component 4 provided on the same side as the laser component 2, i.e. the monitoring component 4 is provided a side of the incidence surface 10 of the crystal 1. The receiving component 3 is used to receive the first beam, and it includes a first condenser lens 31 and an optical fiber 32, wherein the first condenser lens 31 is used to couple the first beam into the optical fiber 32. The monitoring component 4 is used to receive the second beam, and it includes a monitoring device 41 and a second condenser lens 42 provided on the monitoring device 41. The monitoring component 4 is specifically used to adjust the emission power of the laser component 2 based on the power of the received second beam. In an alternative embodiment, the monitoring component 4 determines the power of the received second beam through analysis, and adjusts the emission power of the laser 21 based on a feedback power. The monitoring device 41 may be a backlight detector, and it can also be referred to as a monitoring photodiode.

In addition, the optical assembly further comprises a circuit board 6, on which the laser 21 and the monitoring device 41 both are correspondingly provided. Generally speaking, the laser beam emitted by the laser 21 is perpendicular to the circuit board 6 after being collimated. In order to intuitively explain the reference plane, the plane where the circuit board 6 is located can also be used as the reference plane.

In an alternative embodiment, the optical assembly is applicable to an application scenario of multiway data transmission, in which case the laser component 2 and the monitoring component 4 are correspondingly distributed in a multiway array in an extending direction of the incidence surface 10 of the crystal 1, and the laser component 2 is used to generate multiway laser beams. The first beam 15 and the second beam 16 are correspondingly generated after each laser beam passes through the crystal 1. The receiving component 3 is used to receive the first beams 15 corresponding to the multiway laser beams, and the monitoring component 4 is used to adjust the emission power of corresponding branch laser of the laser component 2 based on the power of each received second beam 16. Specifically, the laser component 2 includes a plurality of laser 21, and the monitoring component 4 includes a plurality of monitoring device 41 which are respectively matched with the laser 21 so as to respectively monitor the emission optical power of the laser 21.

As shown in FIG. 6, a collimated laser beam emitted by the laser component 2 is assumed to be entering the crystal 1 through point O which is taken as the origin point to draw a normal line of the incidence surface 10, and a straight line parallel to the reference plane is drawn from a vertex A of the crystal 1 and intersects with the normal line of the incidence surface 10 at point G, then an angle between the optical axis 5 and the normal line OG is $\gamma_1$, i.e. $\gamma_1$ is the angle of the optical axis 5 of the crystal 1 relative to the normal line of the incidence surface 10, that is, the fourth angle is equal to $\gamma_1$. An angle between the incidence surface 10 and a straight line AG is $\theta1$, i.e. $\theta1$ is the angle of the incidence surface 10 relative to the reference plane, that is, the first angle is equal to $\theta1$. A straight line BL parallel to the reference plane is drawn from a vertex B of the crystal 1, then an angle between the first reflection surface 11 and the straight line BL is α, i.e. α is the angle of the first reflection surface 11 with respect to the reference plane, i.e. the second angle is equal to α. A straight line UV parallel to the reference plane is drawn from the vertex V of the crystal 1, then an angle between the second reflection surface 12 and the straight line UV is β, i.e. β is the angle of the second reflection surface 12 with respect to the reference plane, that is, the third angle is equal to β.

Based on the laser beam with a different wavelength, a different material may be selected for the crystal, and values of α, β, γ1 and θ1 may be determined respectively, so as to realize the light-splitting function.

Since the crystal 1 is made of an anisotropic material, the optical axis 5 does not coincide with the normal line of the crystal 1, and a beam entering from outside is subjected to the birefringence, that is, one beam of light is refracted into two beams of refraction light. A beam of refraction light is taken as the o-light, and another beam of light is taken as the e-light, so as to explain the light-splitting principle of the present embodiment. The refractive index of o-light and e-light are different in crystal 1. The refraction of the o-light satisfies the refraction and reflection laws, while the refraction of the e-light follows a formula (1):

$$\tan\theta_e = \frac{(n_o^2 - n_e^2)\sin 2\gamma_1 + 2n_o n_e \frac{n_1 \sin\theta_1}{\sqrt{n_o^2 \sin^2\gamma_1 + n_e^2 \cos^2\gamma_1 - n^2 \sin^2\theta_1}}}{2(n_o^2 \sin^2\gamma_1 + n_e^2 \cos^2\gamma_1)} \quad (1)$$

where $n_o$ is the refractive index of the o-light in the crystal, $n_e$ is the refractive index of the e-light in the crystal, $\gamma_1$ is the angle of the optical axis of the crystal relative to the normal line of the incidence surface, n is the refractive index of the medium other than the crystal; $\theta_1$ is the incident angle of the laser beam incident to the incidence surface; and $\theta_e$ is the refraction angle of the e-light when it is refracted on the incidence surface.

The reflection of the e-light in the crystal follows a formula (2):

$$\cot\theta_{reflection} = \cot\theta_{incidence} + \frac{2(n_0^2 - n_e^2)}{n_0^2 \sin^2\gamma + n_e^2 \cos^2\gamma} \cos\varepsilon \cos\gamma \quad (2)$$

where $\theta_{incidence}$ is an incident angle of the e-light with respect to the reflection surface, $\theta_{reflection}$ is a reflection angle of the e-light relative to the reflection surface, $n_o$ is the refractive index of the o-light in the crystal, $n_e$ is the refractive index of the B-light in the crystal, γ is the angle between the normal line of the reflection surface and the optical axis, and ε is the angle between the reflection surface and the optical axis.

It can be known from Embodiment 1 that the crystal 1 can split the laser beam in following two ways:

Light-splitting way 1: the first beam is the e-light, i.e. the e-light is emitted as the front light from the emission surface 13 and coupled into the optical fiber 32; and the second beam is the o-light, i.e. the o-light as the back light is refracted and emitted from the incidence surface 10 and then enters the monitoring component 4.

Light-splitting way 2: the first beam is the o-light, i.e. the o-light is emitted as the front light from the emission surface 13 and coupled into the optical fiber 32; and the second beam is the e-light, i.e. the e-light as the back light is refracted and emitted from the incidence surface 10 and then enters the monitoring component 4.

The implementation of the light-splitting way 1 is deduced below with reference to FIG. 7.

Figure 7:
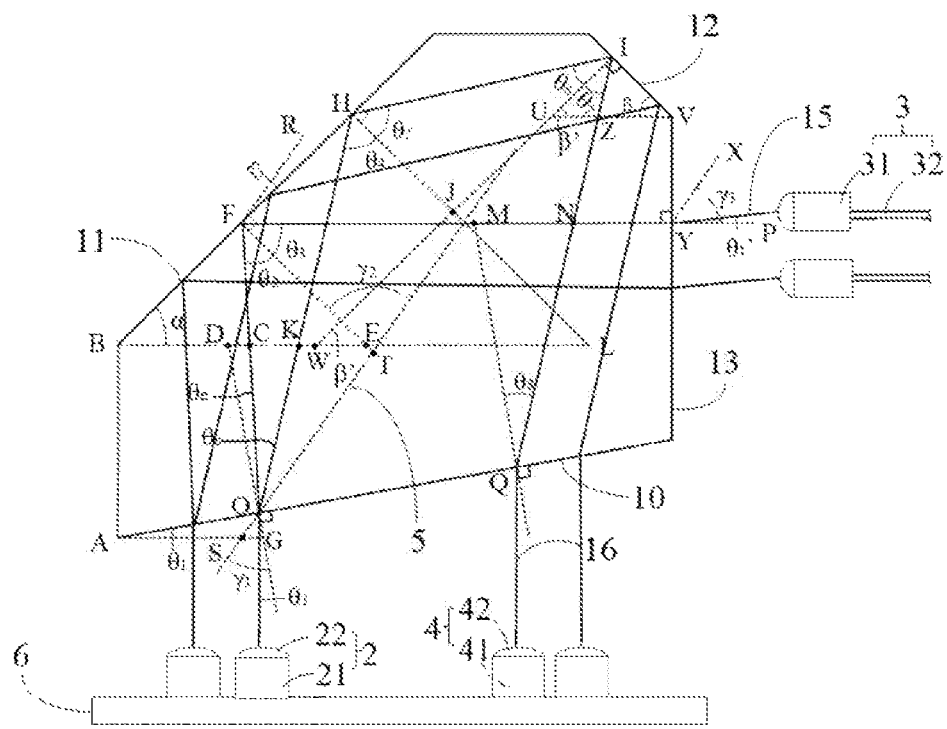
FIG. 7 is a schematic structural diagram of another optical assembly according to an embodiment of the present disclosure.

As shown in FIG. 7, the collimated laser beam produced by the laser component 2 passes through the incidence surface 10 of the crystal 1 and is double-refracted into the e-light 15 (the first beam) and the O-light 16 (the second beam).

The propagation trajectory of the e-light 15(OF-FY) is deduced as follows:

Firstly, auxiliary lines are drawn in the light of following steps (1)-(6):

(1) drawing a normal line of the incidence surface 10 from an intersection point O, as the origin point, of the laser beam and the incidence surface 10;

(2) drawing a straight line parallel to the reference plane from the vertex A, which intersects the normal line at point G;

(3) drawing a straight line BL parallel to the reference plane from the vertex B, which intersects the incidence surface 10 at point D;

(4) propagating the e-light 15 in the crystal 1 along a straight line until it reaches point F of the first reflection surface 11 and is totally reflected at the point F (a straight line OF intersects the straight line BL at point C), and drawing a normal line FT of the first incidence surface 11 from the point F as the origin point, which intersects the optical axis as point T, in this case, the e-light 15 is incident on the first reflection surface 11 at an incident angle $\theta_2$, and is totally reflected on the first reflection surface 11 at a reflection angle $\theta_3$.

The laser beam is perpendicular to the reference plane and the straight line AG is parallel to the reference plane, accordingly, the straight line AG is perpendicular to the laser beam, and then it can be determined that an angle between the laser beam and the normal line is equal to ∠OAG, that is, an incident angle of laser beam on the incidence surface 10 is $\theta_1$.

In ΔOCD and ΔCEF, since ∠OCD and ∠FCE are opposite vertex angles from each other, ∠OCD=∠FCE, then, ∠CDO+∠COD=∠CFE+∠CEF, where ∠COD is an angle between the e-light and the normal line of the incidence surface 10, i.e. an refraction angle of the e-light, thus ∠COD=$\theta_e$; ∠CFE is an incident angle of the e-

In ΔAOG, OG⊥AO, ∠OAG=$\theta_1$, then, ∠OGA=90°−$\theta_1$; In ΔBFE, EF⊥BF light on the first reflection surface 11, thus, ∠CFE=$\theta_2$.

and ∠FBE=α, then, ∠FEB=∠CEF=90°−α; due to BL//AG, ∠CDO=∠OGA, therefore, ∠CDO=90°−$\theta_1$.

In summary, it can be obtained that $\theta_e$+90°−$\theta_1$=$\theta_2$+90°−α, therefore, the incident angle $\theta_2$ of the e-light on the first reflection surface 11 satisfies the following formula (3):

$$\theta_2 = \theta_e + \alpha - \theta_1 \quad (3)$$

where $\theta_e$ is the refraction angle of the e-light, α is the angle of the first reflection surface 11 with respect to the reference plane, $\theta_1$ is the incident angle of laser beam on the incidence surface 10 ($\theta_1$ is the angle of the incidence surface 10 with respect to the reference plane).

In ΔFTO, $\gamma_2$=∠TFO+∠TOF, where $\gamma_2$ is an angle between the optical axis 5 and the normal line of the first reflection surface 11. ∠TOF=∠TOD−∠COD, due to ∠TOD is an angle between the optical axis 5 and the normal line of the incidence surface 10, then, ∠TOD=$\gamma_1$, and ∠COD is the refraction angle of e-light on the incidence surface 10, then, ∠COD=$\theta_e$, therefore, ∠TOF=$\gamma_1-\theta_e$. It can be seen from the above analysis that ∠TFO=$\theta_2$, then, it can be obtained when combined with the formula (3) that $\gamma_2=\theta_2+\gamma_1-\theta_e=\theta_e+\alpha-\theta_1+\gamma_1-\theta_e=\alpha-\theta_1+\gamma_1$;

i.e. $\gamma_2$ meets the following formula (4):

$$\gamma_2=\alpha-\theta_1+\gamma_1 \quad (4)$$

where $\alpha$ is the angle of the first reflection surface 11 with respect to the reference plane, $\theta_1$ is the incident angle of laser light on the incidence surface 10 ($\theta_1$ is the angle of the incidence surface 10 with respect to the reference plane), $\gamma_1$ is the angle between the optical axis of the crystal and the normal line of the incidence surface.

(5) drawing a straight line FR parallel to the optical axis 5 (FR//OT) from the point F, then an angle $\varepsilon_2$ between the straight line FR and the first reflection surface 11 is the angle between the optical axis 5 and the first reflection surface 11. Due to FR//OT, $\varepsilon_2+90°+\gamma_2=180°$, $\varepsilon_2=90°-\gamma_2$, combined with formula (4), it can be obtained that $\varepsilon_2=90°-\gamma_2=90°-(\alpha-\theta_1+\gamma_1)$, then, $\varepsilon_2$ meets the following formula (5):

$$\varepsilon_2=90°+\theta_1-\alpha-\gamma_1 \quad (5)$$

where $\alpha$ is the angle of the first reflection surface 11 with respect to the reference plane, $\theta_1$ is the incident angle of the laser beam on the incidence surface 10 ($\theta_1$ is the angle of the incidence surface 10 with respect to the reference plane), $\gamma_1$ is the angle between the optical axis of the crystal and the normal line of the incidence surface.

Based on the wavelength of the laser beam and the material of the crystal, by reasonably setting values of the angles $\alpha$, $\theta_1$ and $\gamma_1$, the e-light 15 can be reflected on the first reflection surface 11 and then vertically incident onto the emission surface 13. In the present embodiment, the emission surface 13 is set to be perpendicular to the reference plane, then, the e-light 15 is perpendicularly incident on the emission surface 13, and then, it is refracted on and emitted from the emission surface 13.

(6) drawing a straight line XY from an intersection point, point Y, of the e-light 15 and the emission surface 13, which is parallel to the optical axis 5, and drawing a normal line YP of the emission surface 13 from the point Y as the original point, then, an angle (∠XYP) between the straight line XY and the normal line YP is an angle between the normal line of the emission surface 13 and the optical axis 5, and designating ∠XYP=$\gamma_3$;

the straight line YP is the normal line of the emission surface 13, and the emission surface 13 is perpendicular to the reference plane, therefore, the straight line YP is parallel to the reference plane, i.e. YP//AG. As shown in FIG. 7, the straight line AG intersects the optical axis 5 at point S, then, ∠XYP=∠OSG. In △OSG, ∠OSG=180°-∠SOG-∠OGS; ∠SOG=$\gamma_1$, ∠OGS=∠OGA=90°-$\theta_1$, then ∠OSG=90°+$\theta_1$-$\gamma_1$. In the light of the formula (1), an refraction angle $\theta_1'$ of the e-light 15 can be obtained, and then according to the refraction angle $\theta_1'$, an angle of the light-emitting direction of the e-light 15 relative to the reference plane can be determined, so as to determine the position of the receiving component 3, thereby effectively coupling the e-light 15 into the optical fiber 32 and achieving the light-emitting function.

In a preferred embodiment, according to the actual situations, the angle of the emission surface 13 relative to the reference plane can also be designed to cause the B-light 15 to be emitted perpendicularly to the emission surface 13, whereby reducing the process difficulty of coupling.

A propagation trajectory (OH-HII-IQ) of the o light 16 is deduced below based on an example that the emission surface 13 is perpendicular to the reference plane.

The o-light 16 is generated after the laser beam is refracted on the incidence surface 10 of the crystal 1 at an angle $\theta_0$ which can be determined in the light of a refractive index $n_o$ of the o-light 16 on the crystal 1, the incident angle $\theta_1$ of the laser beam incident on the incidence surface 10, and a refractive index n of medium outside the crystal 1. The o-light 16 follows the refraction and reflection laws, and it propagates in the crystal 1 along a preset propagation trajectory until it reaches point H of the first reflection surface 11 where it is totally reflected.

Firstly, auxiliary lines are drawn in the light of following steps (1)-(4):

(1) drawing a normal line HL of the reflection surface from the point H as the origin point, and intersecting the o-light 16 with the straight line BL at point K (i.e. OH intersects BL at point K);

For convenience of description, an incident angle of the o-light 16 on the first reflection surface 11 is designated as $\theta_4$, and a reflection angle of the o-light 16 on the first reflection surface 11 is designated as $\theta_5$. Due to the o-light 16 follows the reflection law, it can be known that $\theta_4=\theta_5$ from the reflection law $n_o \sin\theta_4 = n_o \sin\theta_5$.

In △HKL and △DKO, ∠KHL+∠KLH=∠KDO+∠KOD, where ∠KDO=∠AGO=90°-$\theta_1$, and ∠KOD is the refraction angle of the o-light 16 on the In △BHL, HL⊥BH, ∠HBL=$\alpha$, then ∠KLH=∠BLH=90°-$\alpha$, therefore, incidence surface 10 of the crystal 1, i.e. ∠KOD=$\theta_o$.
∠KHL+90°-$\alpha$=90°-$\theta_1$+$\theta_o$, ∠KHL=$\alpha$-$\theta_1$+$\theta_o$, $\theta_5=\theta_4$=∠KHL, then $\theta_4$ and $\theta_5$ meet the following formula (6):

$$\theta_5=\theta_4=\alpha-\theta_1+\theta_o \quad (6)$$

After being reflected by the first reflection surface 11, the o-light 16 reaches the second reflection surface 12 along a preset propagation path, and intersects the second reflection surface 12 at point I.

(2) drawing a normal line of the second reflection surface 12 from the point I as the origin point, which intersects HL (the normal line of the first reflection surface 11) at point J and intersects BL at point W.

An incident angle (∠HIJ) of the o-light 16 on the second reflection surface 12 is designated as $\theta_6$, and a reflection angle (LUIZ) of the o-light 16 on the second reflection surface 11 is designated as $\theta_7$. Due to the o-light 16 follows the reflection law, it can be known that $\theta_6=\theta_7$ from the law of reflection $n_o \sin\theta_6 = n_o \sin\theta_7$.

In △HJI and △LJW, ∠IHJ+∠HIJ=∠JWL+∠JLW, and in △LJW and △LHB, ∠JLW=∠HLB=90°-$\alpha$;

(3) drawing a straight line parallel to the reference plane from point V, which intersects IW at point U, ∠IVU=$\beta$, then in △IUV, UL⊥VI, and then ∠IUV=90°-$\beta$. Due to UV//BL, ∠JWL=∠IUV=90°-$\beta$. Designating ∠JWL=$\beta'$, then $\beta'$=∠JWL=90°-$\beta$.

In summary, $\theta_5+\theta_6$=90°-$\beta$+90°-$\alpha$. Combined with the formula (6), it can be obtained that $\theta_6=\theta_7$ meets the following formula (7):

$$\theta_6=\theta_7=180°+\theta_1-\theta_o-\beta-2\alpha \quad (7)$$

After being reflected by the second reflection surface 12, the o-light 16 returns to the incidence surface 10 along a preset propagation path and intersects the incidence surface 10 at point Q. The reflected beam of the o-light 16 reflected by the second reflection surface 12 intersects the reflected beam of the e-light 15 by the first reflection surface 11 at point N.

(4) drawing a normal line of the incidence surface from the point Q as the origin point, which intersects the reflected light of e-light 15 by the first reflection surface 11 at point M.

Due to MN//UV (the e-light 15 is emitted in a direction perpendicular to the emission surface 13), then ∠MNQ=∠UZN=∠ZUI+∠ZIU=β'+θ$_7$=90°−β+θ$_7$. Due to MN//BL//AG, MQ//DO, then ∠NMQ=∠CDO=∠AGO=90°−θ$_1$. In ΔMNQ, ∠MQN=180°−∠NMQ−∠MNQ=180°−(90°−θ$_1$)−(90°−β+θ$_7$)=θ$_1$+β−θ$_7$=θ$_1$+β−(180°+θ$_1$−θ$_o$−β−2α)=2β+2α+θ$_o$−180°, where ∠MQN is an incident angle of the o-light 16 on the incidence surface 10 and is designated as ∠MQN=θ$_8$, then θ$_8$ meets the following formula (8):

$$\theta_8 = 2\beta + 2\alpha + \theta_o - 180° \quad (8)$$

Based on the wavelength of laser light and the material of the crystal 1, values of the angles α, β, θ1 and γ$_1$ can be reasonably set such that the o-light 16 can be refracted by the incidence surface 10 and then is emitted parallelly with the laser beam emitted by the laser component 12, that is, the o-light 16 is emitted perpendicularly to the reference plane.

The above deduction explains how to deduce the formula of each angle when the e-light 15 and the o-light 16 are refracted or reflected on the crystal 1, and how to implement the above-mentioned light-splitting way 1 would be specifically explained below based on examples.

Optional Solution 1:

Based on an example of the crystal 1 being LiNbO3 crystal and the laser beam having a wavelength 850 nm, it can be seen from the lookup table that $n_o$=2.25 and $n_e$=2.17. According to the condition of total reflection from an optically dense medium to an optically thinner medium, the following formula is met:

$n_o$ sin θ$_{total\ reflection}$=1, $n_e$ sin θ$_{total\ reflection}$=1, then, θ$_{0\ total\ reflection}$=26.41°, θ$_{e\ total\ reflection}$=27.43°.

A set of values for θ$_1$, γ$_1$, n, α, and β is θ$_1$=10°, γ$_1$=45°, n=1, α=47.2°, β=42.8°.

According to the above formulas (1) to (8), it can be obtained that

θ$_0$=23°, θ$_e$=6.5°, θ$_2$=43.7°, θ$_3$=42.8°, θ$_4$=60.2°, θ$_5$=60.2°, θ$_6$=29.8°, θ$_7$=29.8°, θ$_8$=23°;

then it can be concluded that

θ$_2$>θ$_{e\ total\ reflection}$, then the e-light 15 meets the total reflection condition on the first reflection surface 11, and is totally reflected thereon;

θ$_4$>θ$_{0\ total\ reflection}$, then the o-light 16 meets the total reflection condition on the first reflection surface 11, and is totally reflected thereon;

θ$_6$>θ$_{0\ total\ reflection}$, then the o-light 16 meets the condition of total reflection on the second reflection surface 12, and is totally reflected thereon.

Due to θ$_8$=θ$_0$, in the light of the reversibility principle of beam path, the o-light 16 emitted from the incidence surface 10 of the crystal 1 is perpendicular to the reference plane.

∠HFN=90°−θ$_3$=47.2°=α, therefore FN/BL, that is, FN is parallel to the reference direction, then, the e-light 15 reflected by the first reflection surface 11 of the crystal 1 imponges on the emission surface in a direction parallel to the reference plane.

Optional Solution 2:

Based on an example of the crystal 1 being YVO4 crystal and the laser beam having a wavelength 850 nm, it can be seen from the lookup table that $n_o$=1.97 and $n_e$=2.18. According to the condition of total reflection from an optically dense medium to an optically thinner medium, the following formula is met:

$n_o$ sin θ$_{total\ reflection}$=1, $n_e$ sin θ$_{total\ reflection}$=1, then, θ$_{0\ total\ reflection}$=30.54°, θ$_{e\ total\ reflection}$=27.26°.

A set of values for θ$_1$, γ$_1$, n, α, and β is θ$_1$=14°, γ$_1$=45°, n=1, α=51.5°, β=38.5°.

According to the above formulas (1) to (8), it can be concluded that:

θ$_0$=20.0°, θ$_e$=−1.1°, θ$_2$=36.35°, θ$_3$=38.5°, θ$_4$=57.5°, θ$_5$=57.5°, θ$_6$=32.5°, θ$_7$=32.5°, θ$_8$=20°;

then it can be concluded that

θ$_2$>θ$_{e\ total\ reflection}$, then the e-light 15 meets the total reflection condition on the first reflection surface 11 and is totally reflected thereon;

θ$_4$>θ$_{e\ total\ reflection}$, then the o-light 16 meets the total reflection condition on the first reflection surface 11 and is totally reflected thereon;

θ$_6$>θ$_{0\ total\ reflection}$, then the o-light 16 meets the total reflection condition on the second reflection surface 12 and is totally reflected thereon.

Due to θ$_8$=θ$_0$, in the light of the reversibility principle of beam path, the o-light 16 emitted from the incidence surface 10 of the crystal 1 is perpendicular to the reference plane.

∠HFN=90°−θ$_3$=49.4°=α, therefore, FN/BL, that is, FN is the horizontal direction, then, the e-light 15 reflected by the first reflection surface 11 of the crystal 1 imponges on the emission surface in a direction parallel to the reference plane.

In the present embodiment, the receiving component 3 receives the e-light 15 as the front light to be emitted, and the monitoring component 4 receives the o-light 16 as the back light and adaptively adjusts the laser power of the laser component 2 according to the power of the received o-light 16 so as to ensure the power of the e-light 15 meet the actual needs.

Figure 8:
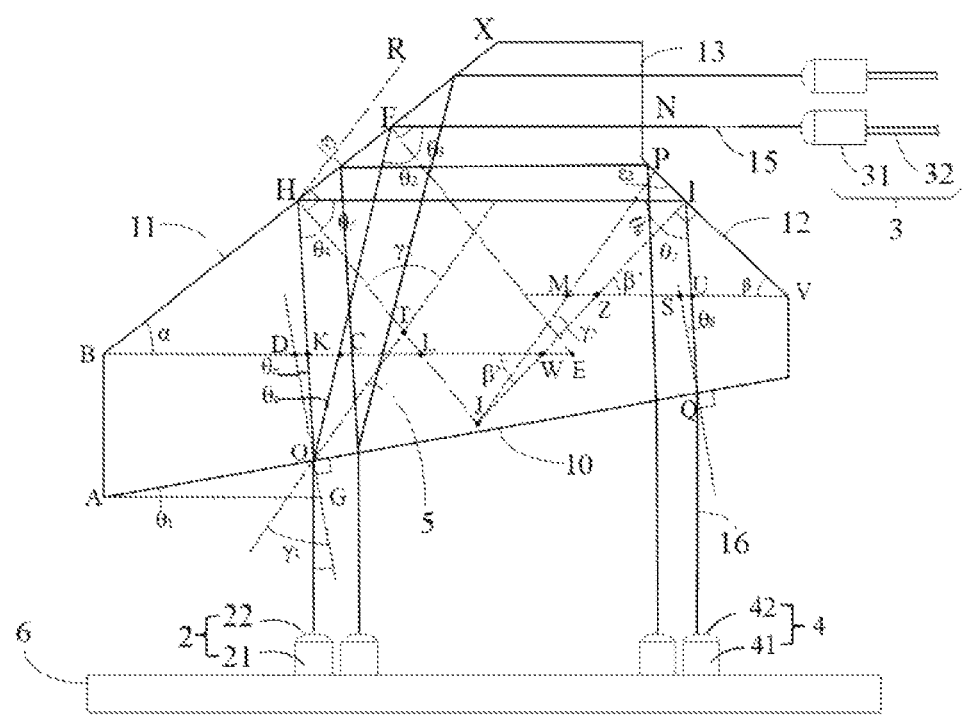
FIG. 8 is a schematic structural diagram of yet another optical assembly according to an embodiment of the present disclosure.

Next, referring to FIG. 8, it is to explain the implementation of the light-splitting way 2.

As shown in FIG. 8, the collimated laser beam produced by the laser component 2 passes through the incidence surface 10 of the crystal 1 and is double-refracted into the o-light 15 (the first beam) and the e-light 16 (the second beam).

The propagation trajectory of the o-light 15(OF-FN) is deduced as follows:

Firstly, auxiliary lines are drawn according to the following steps (1)-(5):

(1) drawing a normal line of the incidence surface 10 from an intection point O, being the origin point, of the laser beam with the incidence surface 10;

(2) drawing a straight line parallel to the reference plane from the vertex A, which intersects the normal line of the incidence surface 10 at point G;

(3) drawing a straight line BE parallel to the reference plane from the vertex B, which intersects the normal line of the incidence surface 10 at point D;

(4) propagating the o-light 15 in the crystal 1 in a straight line after the o-light 15 entered the crystal 1 from the incidence surface 10, until the o-light 15 reaches the point F of the first reflection surface 11 and is totally reflected (a straight line OF intersects the straight line BE at point C), and drawing a normal line FE of the first reflection surface 11 from the point O being the origin point;

(5) designating an incident angle of the o-light 15 on the first reflection surface 11 as θ$_2$ and a total reflection angle of the o-light 15 on the first reflection surface 11 is $\theta_3$; emitting the reflected o-light 15, as a front light, through the emission surface 13.

The laser beam is perpendicular to the reference plane and the straight line AG is parallel to the reference plane, therefore, the straight line AG is perpendicular to the laser beam, then it can be determined that an angle between the laser light and the normal line is equal to ∠OAG, that is, the incident angle of laser beam on the incident plane 10 is $\theta_1$.

In ΔOCD and ΔECF, ∠COD+∠CDO=∠CEF+∠CFE, where ∠CFE is an incident angle of o-light 15 on the first emitting surface 11, i.e. ∠CFE=$\theta_2$. In ΔBEF, EF⊥BF, ∠CEF=∠BEF=90°−α. Due to BE//AG, then ∠CDO=∠OGA. In ΔAGO, ∠OGA=90°−$\theta_1$. Due to ∠COD is a refraction angle of o-light 15 in the crystal 1, i.e. ∠COD=$\theta_o$.

In summary, $\theta_o+90°-\theta_1=90°-\alpha+\theta_2$, therefore, the incident angle $\theta_2$ of the o-light 15 on the first reflection surface 11 meets the following formula (10):

$$\theta_2=\theta_o+\alpha-\theta_1 \quad (10)$$

where $\theta_o$ is the refraction angle of o-light, α is the angle of the first reflection surface 11 with respect to the reference plane, $\theta_1$ is the incident angle of the laser beam on the incidence surface 10 ($\theta_1$ is the angle of the incidence surface 10 with respect to the reference plane).

Because the propagation of the o-light 15 in the crystal 1 follows the reflection law, it is known from the law of reflection $n_o \sin \theta_2 = n_o \sin \theta_3$ that $\theta_2=\theta_3$. Therefore, the reflection angle $\theta_3$ of the o-light 15 on the first reflection surface 11 also meets the above formula (10).

Based on the wavelength of the laser light and the material of the crystal, values of the angles α and $\theta_1$ can be reasonably set such that the o-light 15 can be vertically incident to the emission surface 13 after being reflected by the first reflection surface 11, so as to ensure that the olight 15 is emitted perpendicularly from the emission surface 13.

A propagation trajectory (OH-HII-IQ) of the e-light 16 is deduced below based on an example of the emmission of the o-light 15 being perpendicular to the emission surface 13.

Firstly, auxiliary lines are drawn according to the following steps (1)-(7):

(1) refracting the laser beam at the incidence surface 10 of the crystal 1 at the the refraction angle $\theta_e$ (relative to the normal line OG of the incidence surface 10) to generate the e-light 16 which intersects with the first reflection surface 11 at point H, wherein OH intersect BE at the point K;

(2) drawing a normal line of the first reflection surface 11 from the point H as the origin point, which intersects the optical axis 5 at point T and BE at point L;

in ΔHKL and ΔDKO, ∠KHL+∠KLH=∠KDO+∠KOD, wherein ∠KHL is the incident angle of the e-light 16 on the first refraction surface 11 and is designated as ∠KHL=$\theta_4$. Due to ∠KLH=∠BLH=90°−α, ∠KDO=∠AGO=90°−$\theta_1$, then, $\theta_4+90°-\alpha=90°-\theta_1+\theta_e$. Therefore, it can be seen that the incident angle $\theta_4$ of the e-light 16 on the first reflection surface 11 meets the following formula (11):

$$\theta_4=\alpha-\theta_1+\theta_e \quad (11)$$

where $\theta_e$ is the refraction angle of the e-light 16, α is the angle of the first reflection surface 11 with respect to the reference plane, $\theta_1$ is the incident angle of the laser beam on the incidence surface 10 ($\theta_1$ is the angle of the incidence surface 10 with respect to the reference plane).

Since ∠DOT is the angle between the optical axis 5 and the normal line of the incidence surface 10, then, ∠DOT=$\gamma_1$. Due to ∠DOT=∠HOT+∠DOH, and ∠DOH is the refraction angle of the e-light 16 on the incidence surface 10, then, ∠DOH=$\theta_e$, therefore, ∠HOT=$\gamma_1-\theta_e$. The angle between the optical axis 5 and the normal line of the first reflection surface 11 is designated as γ2, and it can be seen from FIG. 3 that $\gamma_2$=∠THO+∠HOT=$\theta_4+\gamma_1-\theta_e$, then, combined with formula (11), it can be concluded that $\gamma_2$ meets the following formula (12):

$$\gamma_2=\alpha-\theta_1+\gamma_1 \quad (12)$$

(3) drawing a straight line HR parallel to the optical axis 5 from point H, and an angle between HR and the first reflection surface 11 is $\varepsilon_2$ (the angle between the optical axis 5 and the first reflection surface), i.e. ∠RHF=$\varepsilon_2$;

due to HR//OT, then, ∠RHT+$\gamma_2$=180°, i.e. ∠RHF+ ∠FHT+$\gamma_2$=180°, due to FH⊥FT, then, ∠FHT=90°, thus, $\varepsilon_2+90°+\gamma_2=180°$, therefore, the angle $\varepsilon_2$ between the optical axis 5 and the first reflection surface 11 meets the following formula (13):

$$\varepsilon_2=90°-\gamma_2 \quad (13)$$

(4) propagating the e-light 16 along a preset propagation path after it is reflected by the first reflection surface 11, and drawing a normal line of the second reflection surface 12 from an intersection point I, being the origin point, of the e-light 16 and the second reflection surface 12, which intersects HL (the normal line of the first reflection surface 11) at point J and intersects BE at point W; designating the incident angle of the e-light 16 on the second reflecting surface 12 as $\theta_6$ and the reflection angle of the B-light 16 on the second reflecting surface 12 as $\theta_7$;

(5) drawing a straight line parallel to the optical axis 5 from the point J as a starting point, which intersects the second reflection surface 12 at point P;

(6) drawing a straight line parallel to the reference plane (i.e. a straight line parallel to BE) from the vertex V as a starting point, which intersects the straight line IJ at point Z and intersects the straight line PJ at point M;

Because the straight line BE is parallel to the straight line ZV, then, ∠LWJ=∠IZV, which are designated as ∠LWJ=∠IZV=β', and in ΔIZV, IZ⊥IV, then, β'=∠IZV=90°− β, (where β is the angle of the second reflection surface 12 with respect to the reference plane).

In ΔHJI and ΔLJW, ∠IHJ+∠HIJ=∠WLJ+∠LWJ, where ZHU is the incident angle of the e-light 16 on the second reflection surface 12, and LIM is the reflection angle of the e-light 16 on the first reflection surface 11, i.e. ∠IHJ=$\theta_5$, ∠HIJ=$\theta_6$. Due to ∠WLJ=∠BLH=90°−α, then, $\theta_5+\theta_6=90°-\alpha+90°-\beta$. Therefore, it can be concluded that the incident angle $\theta_6$ of the e-light 16 on the second reflection surface 12 meets the following formula (14):

$$\theta_6=180°-\alpha-\beta-\theta_5 \quad (14)$$

Since PJ(PM)//optical axis 5(OT), then, ∠LJM=$\gamma_2$; In ΔHJI, ∠HJI=180°−∠JIH=180°−$\theta_5-\theta_6$, since ∠MJI=∠LJW−∠LJM, then, ∠MJI=∠HJI−∠LJM=180°− $\theta_5-\theta_6-\gamma_2$, where ∠MJI is the angle between the normal line of the second reflection surface 12 and the optical axis 5 and is designated as ∠MJI=$\gamma_3$, then, it can be seen that $\gamma_3$ can meet the following formula (16):

$$\gamma_3=180°-\theta_5-\theta_6-\gamma_2 \quad (16)$$

Since ΔJIP is a right-angled triangle, then, ∠JPI=90°− ∠PJI, where ∠JPI is the angle between the optical axis 5 and the second reflection surface 12 and is designated as ∠JPI=$\varepsilon_3$, then, it can be concluded that 13 meets the following formula (17):

$$\varepsilon_3=90°-\gamma_3 \quad (17)$$

(7) impinging the reflected e-light 16 by the second reflection surface 12 on the incidence surface 10, which intersects the incidence surface 10 at point Q, and drawing a normal line of the incidence surface 10 from the point Q as the origin point, which intersects the MV at point S, and IQ intersects the straight line MV at point U;

Due to SQ//OG and SU//AG, therefore, ∠USQ=∠AGO=90°−θ$_1$. In ΔZIU, ∠ZIU is a reflection angle of the e-light 16 on the second reflection surface 12, then, ∠ZIU=θ$_7$, ∠IZU=β', ∠SUQ=∠ZIU+∠IZU=θ$_7$+β'=θ$_7$+90°−β. In ΔSUQ, θ$_8$=180°−∠USQ−∠SUQ, therefore, θ$_8$=180°−(90°−θ$_1$)−(θ$_7$+90°−β). It can be concluded that κ$_8$ meets the following formula (18):

$$\theta_8 = \theta_1 + \beta - \theta_7 \quad (18)$$

Based on the wavelength of laser light and the material of the crystal 1, valueds of the angles α, β, θ1 and γ$_1$ can be reasonably set such that the e-light 16 can be refracted by the incidence surface 10 and then emitted parallelly to the laser beam sent by the laser component 2, i.e. the e-light 16 is emitted perpendicularly to the reference plane.

The above deduction explains how to deduce the formula of each angle when the o-light 15 and the e-light 16 are refracted on the crystal 1 or emitted from the crystal 1, and it is to explain how to implement the above-mentioned light-splitting way 2 by means of examples.

Based on an example of the crystal 1 being LiNbO3 crystal and the laser beam having a wavelength of being 850 nm as an example, it can be seen from the lookup table that $n_o$=2.25 and $n_e$=2.17. According to the condition of total reflection from an optically dense medium to an optically thinner medium, the following formula is satisfied:

$n_o \sin \theta_{total\ reflection}=1$, $n_o \sin \theta_{total\ reflection}=1$; then, $\theta_{0\ total\ reflection}=26.41°$, $\theta_{e\ total\ reflection}=27.43°$.

A set of values for θ$_1$, γ$_1$, n, α, and β is θ$_1$=10°, γ$_1$=45°, n=1, α=38.5°, β=51.3°.

According to the above formulas (1), (2), (10)-(18), it can be concluded that

θ$_0$=23°, θ$_e$=6.5°, θ$_2$=51.5°, θ$_3$=51.5°, θ$_4$=35°, θ$_5$=34.7°, θ$_6$=55.5°, θ$_7$=54.8°, θ$_8$=6.5°;

then it can be concluded that:

θ$_2$>θ$_{0\ total\ reflection}$, then o-light 15 meets the total reflection condition on the first reflection surface 11 and is totally reflected thereon;

θ$_4$>θ$_{0\ total\ reflection}$, then the e-light 16 meets the total reflection condition on the first reflection surface 11, and is totally reflected thereon;

θ$_6$>θ$_{0\ total\ reflection}$, then the e-light 16 meets the total reflection condition on the second reflection surface 12, and is totally reflected thereon.

Due to θ$_8$=θ$_e$, according to the reversibility principle of beam path, the e-light 16 emitted from the incidence surface 10 of the crystal 1 is perpendicular to the reference plane.

∠XFN=90°−θ$_3$=38.5°=α, therefore, FN/BL, that is, FN is parallel to the reference direction, then, the o-light 15 reflected by the first reflection surface 11 of the crystal 1 impinges on the emission surface in a direction parallel to the reference plane, since the emission surface 13 is perpendicular to the reference plane, the o-light 15 is emitted in a direction perpendicular to the emission surface 13.

Optional Solution 2:

Based on an example of the crystal 1 being YVO4 crystal and the laser beam having a wavelength 850 nm, it can be seen from the lookup table that $n_o$=1.97 and $n_e$=2.18. According to the condition of total reflection from an optically dense medium to an optically thinner medium, the following formula is satisfied:

$n_o \sin \theta_{total\ reflection}=1$, $n_e \sin \theta_{total\ reflection}=1$; then, $\theta_{0\ total\ reflection}=30.51°$, $\theta_{e\ total\ reflection}=27.26°$.

A set of values for θ$_1$, γ$_1$, n, α, and β is θ$_1$=10°, γ$_1$=45°, n=1, α=40°, β=50.7°.

According to the above formulas (1), (2), (10) to (18), it can be concluded that θ$_0$=20°, θ$_e$=−1.1°, θ$_2$=50°, θ$_3$=50°, θ$_4$=28.9°, θ$_5$=29.6°, θ$_6$=59.7°, θ$_7$=61.8°, θ$_8$=−1.1°, then it can be concluded that:

θ$_2$>θ$_{0\ total\ reflection}$, then the o-light 15 meets the total reflection condition on the first reflection surface 11 and is totally reflected thereon;

θ$_4$>θ$_{0\ total\ reflection}$, then the e-light 16 meets the total reflection condition on the first reflection surface 11 and is totally reflected thereon;

θ$_6$>θ$_{0\ total\ reflection}$, then the e-light 16 meets the condition of total reflection on the second reflection surface 12 and is totally reflected thereon.

Due to θ$_8$=θ$_e$, according to the reversibility principle of beam path, the e-light 16 emitted from the incidence surface 10 of the crystal 1 is perpendicular to the reference plane.

∠XFN=90°−θ$_3$=40°=α, therefore, FN//BL, that is, FN is parallel to the reference direction, then, the o-light 15 reflected by the first reflection surface 11 of the crystal 1 impinges on the emission surface in a direction parallel to the reference plane. Since the emission surface 13 is perpendicular to the reference plane, the o-light 15 is emitted in a direction perpendicular to the emission surface 13.

Here, it should be emphasized that the aforementioned values are results obtained by rounding, and the angle values of the crystal 1 mentioned in the above solutions are optimal results to ensure total reflection of the beam on the reflection surfaces in order to achieve the effect of making full use of the light energy. In a practical manufacturing and production process, however, due to the process error or other considerations, the respective angle values may be different from those listed above, i.e. a certain tolerance range may be allowable. The inventors found by a lot of experiments that when the first angle, the second angle, the second angle, the third angle and the fourth angle respectively have a tolerance within ±1°, the good light-splitting effect can also be realized. a better light-splitting effect can also be realized although a small amount of light is refracted.

It can be seen from the foregoing analysis that the present embodiments provides two different structures of the crystal 1 respectively corresponding to the two light-splitting ways. Specifically, the crystal 1 corresponding to the light-splitting way 1 needs lower process requirements, while the crystal 1 corresponding to the light-splitting way 2 has a smaller size, and they may be selected during actual use according to actual situations.

The present embodiment is deduced and explained in a case where the laser wavelength is 850 nm. In addition, in other embodiments, the laser beam with a wavelength of 1310 nm or 1550 nm is also applicable to the light-splitting method of the present embodiment, and when it is used in a practical application scenario, the angles of each surface of the crystal 1 can be calculated and correspondingly set according to the aforementioned formulas (1) to (18).

In contrary to the prior arts, the present disclosure uses a crystal with a specific structure, through the incidence surface of which the collimated laser beam passes and is double-refracted into the first beam and the second beam, wherein the first beam is totally reflected on the first reflection surface and is emitted as the front light through the emission surface, and the second beam is totally reflected on the first reflection surface and the second reflection surface and is emitted as the back light through the incidence surface. According to the present disclosure, the crystal can split a laser beam without adding a spitter film, so as to realize the backlight monitoring function, and to adaptively adjust the emission power of the laser. The light-splitting method of the present disclosure has good stability and can reduce the risk of failure in the optical device.

Embodiment 4

Referring to FIG. 9, the present embodiment provides a method for manufacturing an optical assembly, which is applicable to the optical assembly of any of the above embodiments. The method for manufacturing an optical assembly comprises the following steps:

Step 90: providing a laser component on a predetermined reference plane and setting the laser component to emit a laser beam in a direction.

In the present embodiment, the optical assembly includes a crystal and a laser component, wherein the crystals of any of the above embodiments can be used to prepare the optical assemblys of the present embodiment, and the appropriate crystals can be selected according to actual needs.

Specifically, the laser component includes a laser and a collimating lens provided on the laser, wherein the laser is used to produce a laser beam with a preset wavelength, and the collimating lens is used to integrate the laser beam into a collimated laser beam and enable the laser component to generate a collimated laser beam.

The reference plane is only used to facilitate to describe the position of the crystal in the present embodiment, and may be a physical plane or a virtual plane. For example, the reference plane can be a horizontal plane in the earth coordinate system or a plane in another direction, or a circuit board or on other platform as long as the propagation direction of the laser beam is ensured to perpendicular to the reference plane.

For convenience of description, as an example, the reference plane is described as a circuit board. In an actual manufacturing process, the laser is provided on the circuit board, and the collimating lens is provided on the laser. In the present embodiment, the laser beam emitted by the laser generally is an elliptically polarized light or a circularly polarized light. In order to ensure that laser beams are incident on the incidence surface of the crystal in a consistent direction, the laser beams emitted by the laser are collimated by a collimating lens, so that the laser beam emitted from the laser component is perpendicular to the reference plane.

On the other hand, since the laser beam emitted by the laser component is a parallel beam, the height of the crystal relative to the circuit board can be reduced, thus reducing the package size of the optical assembly.

Step 91: providing a crystal that meets a light-splitting condition at a predetermined position such that the crystal splits the laser beam incident on an incidence surface of the crystal into a first beam and a second beam, the first beam being emitted from an emission surface, and the second beam being emitted from the incidence surface.

The crystal is an anisotropic material, and an optical axis of the crystal does not coincide with an interface normal line of the crystal, thus a beam entered the crystal is double-refracted, that is to say, one beam of light is refracted into two beams of refraction lights. Specifically, the crystal comprises an incidence surface, an emission surface, a first reflection surface, and an emission surface. The crystal structure can be reasonly designed to realize the light-splitting function.

In practical application scenarios, the refractive index of laser beam in crystal would vary with variations of wavelengths of laser beam emitted by the laser component, thus affecting the propagation path of beam. Correspondingly, the refractive index of the laser light with the same wavelength in the crystal would vary with variations of material of the crystal, thus affecting the propagation path of beam. Therefore, in the present embodiment, the wavelength of the laser beam emitted by the laser component is determined depending on actual application scenarios. For example, the wavelength of the laser beam can be 850 nm, 1310 nm or 1550 nm and the like. Then, the material of the crystal is selected depending on the wavelength of the laser beam emitted by the laser component, and it can be LiNbO3 crystal or YVO4 crystal and so on. It can be selected for the wavelength of the laser light emitted by the laser component and the material of the crystal according to actual requirements.

After determining the wavelength of the laser light emitted by the laser component and the material of the crystal, it can provide the angle of the incidence surface relative to the reference plane, the angle of the first reflection surface and the angle of the second reflection surface relative to the reference plane, and the angle of the optical axis of the crystal relative to the normal line of the incidence surface such that the laser beam incident from the incidence surface is separated into the first beam and the second beam, wherein the first beam is totally reflected on the first reflection surface and then is emitted through the emission surface, and the second beam is totally reflected on the first reflection surface and the second reflection surface and then is emitted through the incidence surface.

Further, the receiving component is provided on the light-emitting surface side of the crystal, wherein the receiving component includes a condensing lens and an optical fiber, and the condensing lens condenses the first beam and then couples the first beam to the optical fiber to implement data transmission. In order to monitor and adjust the emission power of the laser component in real time, in a preferred embodiment, a monitoring component can be provided on the circuit board, wherein the monitoring component includes a monitoring device and a condenser lens, the condensing lens being used to condense the second beam and then conducting it to the monitoring device, and the monitoring device being used to monitor the power of the second beam in real time and adjust the current in real time according to a monitoring result, so as to adjust the emission power of the laser component, thus realizing the backlight monitoring function and ensuring that the power of the first beam fully meets needs.

When the polarization states of the laser components are different, the energy ratios corresponding to the first beam and the second beam are also different. Since the first beam is emitted as the front light, it needs a higher power, while the second beam is used as the back light, it requires a less power, in order to ensure that the light energy is fully utilized. In a preferred embodiment, the types of the first beam and of the second beam are determined based on the polarization state of the laser beam emitted by the laser component, wherein the energy of the first beam is greater than that of the second beam.

Further, the material of the crystal is selected based on the wavelength of the laser beam emitted by the laser component. Specifically, the angle of the incidence surface relative to the reference plane, the angle of the first reflection surface and the angle of the second reflection surface relative to the reference plane, and the angle of the optical axis of the crystal relative to the normal line of the incidence surface are set depending on the type of the first beam, the type of the second beam, the material of the crystal and the wavelength of the laser, so that the laser beam incident on the incidence surface is separated into the first beam and the second beam, wherein the first beam is totally reflected on the first reflection surface and then is emitted through the emission surface, and the second beam is totally reflected on the first reflection surface and the second reflection surface and then is emitted through the incidence surface.

The manufacturing method of the present embodiment can manufacture the optical assembly of any of the above embodiments, specifically referring to FIG. 6 to FIG. 8 and the related literal description, which will not be repeated here.

In contrary to the prior arts, the present disclosure adopts a crystal with a specific structure, through an incidence surface of which the collimated laser beam is double-refracted into a first beam and a second beam, wherein the first beam is totally reflected on the first reflection surface and then is emitted as the front light through the emission surface, and the second beam is totally reflected on the first reflection surface and the second reflection surface and then is emitted as the backlight through the incidence surface. According to the present disclosure, a laser beam is split without adding a light-splitting film to the crystal, so as to realize the backlight monitoring function and adaptively adjust the emission power of the laser. The light-splitting method of the present disclosure has good stability, and meanwhile, it eliminates the process for plating the splitter film such as film layer designing, film material purchasing, film layer plating, inspection, reliability test, and the like, thereby reducing the risk of failure of the optical device.

Those skilled in the art can easily understand that the above described embodiments are merely preferred embodiments of the present disclosure, but are not intended to limit the present disclosure, and any modification, equivalent replacement, and improvement made without departing from the spirit and principle of the present disclosure shall fall within the protection scope of the present disclosure.

What is claimed is:

1. An optical assembly, characterized in comprising a crystal (1) and a laser component (2), the crystal (1) being disposed on the laser component (2);
   the laser component (2) being used to generate a laser beam, and the crystal (1) being used to split the laser beam incident on the crystal (1) to generate a first beam (15) and a second beam (16);
   wherein the first beam (15) is used for frontlight emission, and the second beam (16) is used for backlight monitoring,
   wherein the laser component (2) is used to generate a collimated laser beam perpendicular to a predefined reference plane; the crystal (1) includes an incidence surface (10), a first reflection surface (11), a second reflection surface (12) and an emission surface (13), the incidence surface (10) forms a first angle with respect to the reference plane, the first reflection surface (11) forms a second angle with respect to the reference plane, the second reflection surface (12) forms a third angle with respect to the reference plane, and an optical axis (5) of the crystal (1) forms a fourth angle with respect to a normal line of the incidence surface (10); the first angle, the second angle, the third angle and the fourth angle cause the laser beam entering the crystal (1) through the incidence surface (10) to be refracted into the first beam (15) and the second beam (16), the first beam (15) being totally reflected on the first reflection surface (11) and then emitted through the emission surface (13), and the second beam (16) being totally reflected on the first reflection surface (11) and the second reflection surface (12) and then emitted through the incidence surface (10);
   and wherein the first beam (15) and the second beam (16) have a wavelength of 850 nm; the first beam (15) comprises e-light, and the second beam (16) comprises o-light; the crystal (1) is a YVO4 crystal, the first angle is 14°±1°, the second angle is 51.5°±1°, the third angle is 38.5°±1°, and the fourth angle is 45°±1°, or the first beam (15) and the second beam (16) have a wavelength of 850 nm; the first beam (15) comprises e-light, the second beam (16) comprises o-light; the crystal (1) is a LiNbO3 crystal, the first angle is 10°±1°, the second angle is 47.2°±1°, the third angle is 42.8°±1°, and the fourth angle is 45°±1°, or the first beam (15) and the second beam (16) have a wavelength of 850 nm; the first beam (15) comprises o-light, and the second beam (16) comprises e-light; the crystal (1) is a YVO4 crystal, the first angle is 10°±1°, the second angle is 40°±1°, the third angle is 50.7°±1°, and the fourth angle is 45°±1°, or the first beam (15) and the second beam (16) have a wavelength of 850 nm; the first beam (15) comprises o-light, and the second beam (16) comprises e-light; the crystal (1) is a LiNbO3 crystal, the first angle is 10°±1°, the second angle is 38.5°±1°, the third angle is 51.3°±1°, and the fourth angle is 45°±1°.

2. The optical assembly of claim 1, characterized in that the first beam (15) is used as frontlight, and the second beam (16) is used as backlight; the optical assembly further comprises a receiving component (3) and a monitoring component (4), the receiving component (3) being provided on an emission surface (13) side of the crystal (1), and the monitoring component (4) being provided on the same side as the laser component (2); and
   the receiving component (3) is used to receive the first beam (15), the monitoring component (4) is used to receive the second beam (16) and adjust the emission power of the laser component (2) according to the received power of the second beam (16).

3. The optical assembly of claim 2, characterized in that the receiving component (3) includes a first condenser lens (31) and an optical fiber (32), and the first condenser lens (31) couples the first beam (15) into the optical fiber (32); the monitoring component (4) includes a monitoring device (41) and a second condenser lens (42) provided on the monitoring device (41).

4. The optical assembly of claim 2, characterized in that the laser component (2) and the monitoring component (4) are arranged in a multi-path array in an extending direction of the incidence surface (10) of the crystal (1), and the laser component (2) is used to produce multiple laser beams;
   wherein each laser beam generates the corresponding first beam (15) and second beam (16) when passing through the crystal (1), the receiving component (3) is used to receive the first beams (15) corresponding to the multiple laser beams, and the monitoring component (4) is used to adjust the emission power of branch laser beams from the laser component (2) based on the received power of the respective corresponding second beams (16).

5. A method for manufacturing an optical assembly, characterized in comprising:

provoding a laser component on a predetermined reference plane and setting the laser component to emit a laser beam in a direction;

providing a crystal that meets a light-splitting condition at a predetermined position such that the crystal splits the laser beam incident on an incidence surface of the crystal into a first beam and a second beam, the first beam being emitted from an emission surface of the crystal, and the second beam being emitted from the incidence surface wherein providing a laser component on a predetermined reference plane and setting the laser component to emit a laser beam in a direction comprises: providing the laser component on the predetermined reference plane; collimating the laser beam emitted from the laser component so that the laser beam emitted from the laser component is perpendicular to the reference plane;

wherein the crystal further includes a first reflection surface and a second reflection surface; and providing a crystal that meets a light-splitting condition at a predetermined position so that the crystal splits the laser beam incident on the incidence surface of the crystal into a first beam and a second beam comprises:

determining a type of the first beam and a type of the second beam based on a polarization state of the laser beam emitted by the laser component, wherein energy of the first beam is greater than that of the second beam;

selecting a material for the crystal based on a wavelength of the laser beam emitted by the laser component;

setting an angle of the incidence surface with respect to the reference plane, an angle of the first reflection surface with respect to the reference plane, an angle of the second reflection surface with respect to the reference, and an angle of an optical axis of the crystal with respect to a normal line of the incidence surface based on the type of the first beam, the type of the second beam, the material of the crystal, and the wavelength of the laser beam such that the laser beam incident on the incidence surface is split into the first beam and the second beam, the first beam is totally reflected on the first reflection surface and then emitted through the emission surface, and the second beam is totally reflected on the first reflection surface and the second reflection surface and then emitted through the incidence surface.

* * * * *